(12) United States Patent
Lalikyan et al.

(10) Patent No.: US 6,412,803 B1
(45) Date of Patent: Jul. 2, 2002

(54) FRONT FORK FOR CYCLES

(75) Inventors: Eric E. Lalikyan, Van Nuys; Jose L. Gonzalez, Santa Clarita, both of CA (US)

(73) Assignee: Answer Products, Inc., Valencia, CA (US)

( * ) Notice: Subject to any disclaimer, the term of this patent is extended or adjusted under 35 U.S.C. 154(b) by 0 days.

(21) Appl. No.: 09/848,424

(22) Filed: May 4, 2001

(51) Int. Cl.[7] ............................................. B62K 25/02
(52) U.S. Cl. .................... 280/276; 280/279; 301/124.2; 301/110.5
(58) Field of Search ................................ 280/276, 277, 280/279, 11.223, 281.1, 270; 301/124.2, 110.5, 111, 112, 114

(56) References Cited

U.S. PATENT DOCUMENTS

| | | | | |
|---|---|---|---|---|
| 4,930,844 A | * | 6/1990 | Giroux | 301/63 PW |
| D338,184 S | | 8/1993 | Ringle et al. | |
| 5,238,259 A | * | 8/1993 | Wilson et al. | 280/276 |
| D340,888 S | | 11/1993 | Ringle et al. | |
| 5,518,096 A | * | 5/1996 | Lin | 192/64 |
| 5,597,169 A | * | 1/1997 | Bradbury | 280/276 |
| 5,626,401 A | * | 5/1997 | Terry, Sr. et al. | 301/59 |
| 5,833,259 A | | 11/1998 | Stewart | |
| 5,848,675 A | | 12/1998 | Gonzalez | |
| 5,984,423 A | | 11/1999 | Becker | |
| 6,109,635 A | * | 8/2000 | Maeda et al. | 280/279 |
| 6,120,049 A | | 9/2000 | Gonzalez et al. | |
| 6,230,849 B1 | * | 5/2001 | Lumpkin | 188/24.12 |
| 6,264,285 B1 | * | 7/2001 | Yu | 301/110.5 |

FOREIGN PATENT DOCUMENTS

DE 29601870 * 7/1996

OTHER PUBLICATIONS

Ringle 1997 Racing Components Product Catalog.
Ringle New for '96 SUPERDUPERBUBBA Advertisement.
Vélo Tout Terrain, Grande Taille, p. 17, Oct. 2000.
Cushionbury, Mike, Manitou's 2002 Dorado Single–Crown Fork, bikemag.com, Oct. 24, 2000.

* cited by examiner

Primary Examiner—Avraham Lerner
(74) Attorney, Agent, or Firm—Lawrence E. Laubscher, Sr.

(57) ABSTRACT

An inverted front fork and wheel assembly for bicycles and motorcycles includes an axle having non-circular end portions that are clamped within corresponding non-circular dropout openings, thereby to increase the torsional stiffness of the fork.

11 Claims, 4 Drawing Sheets

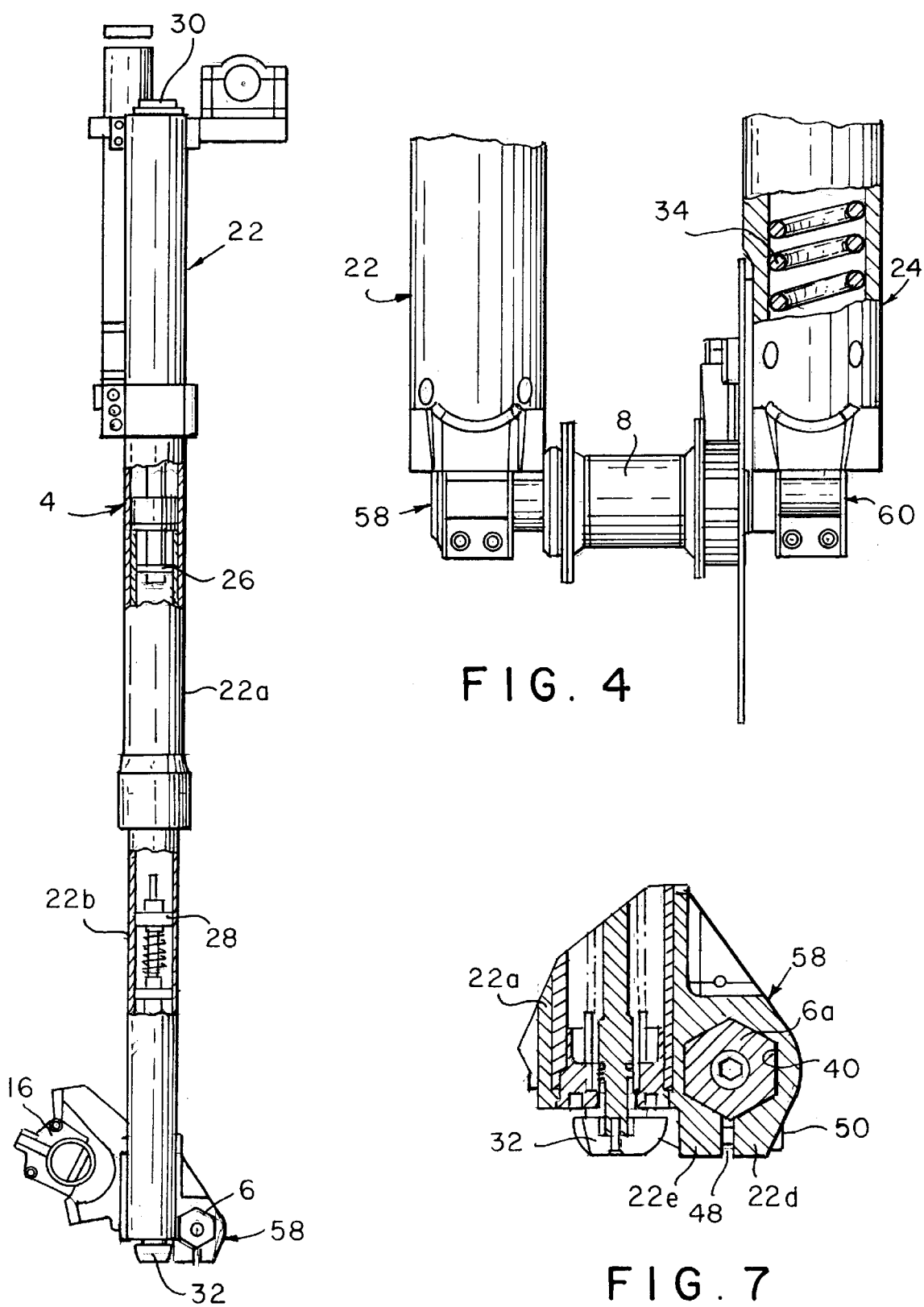

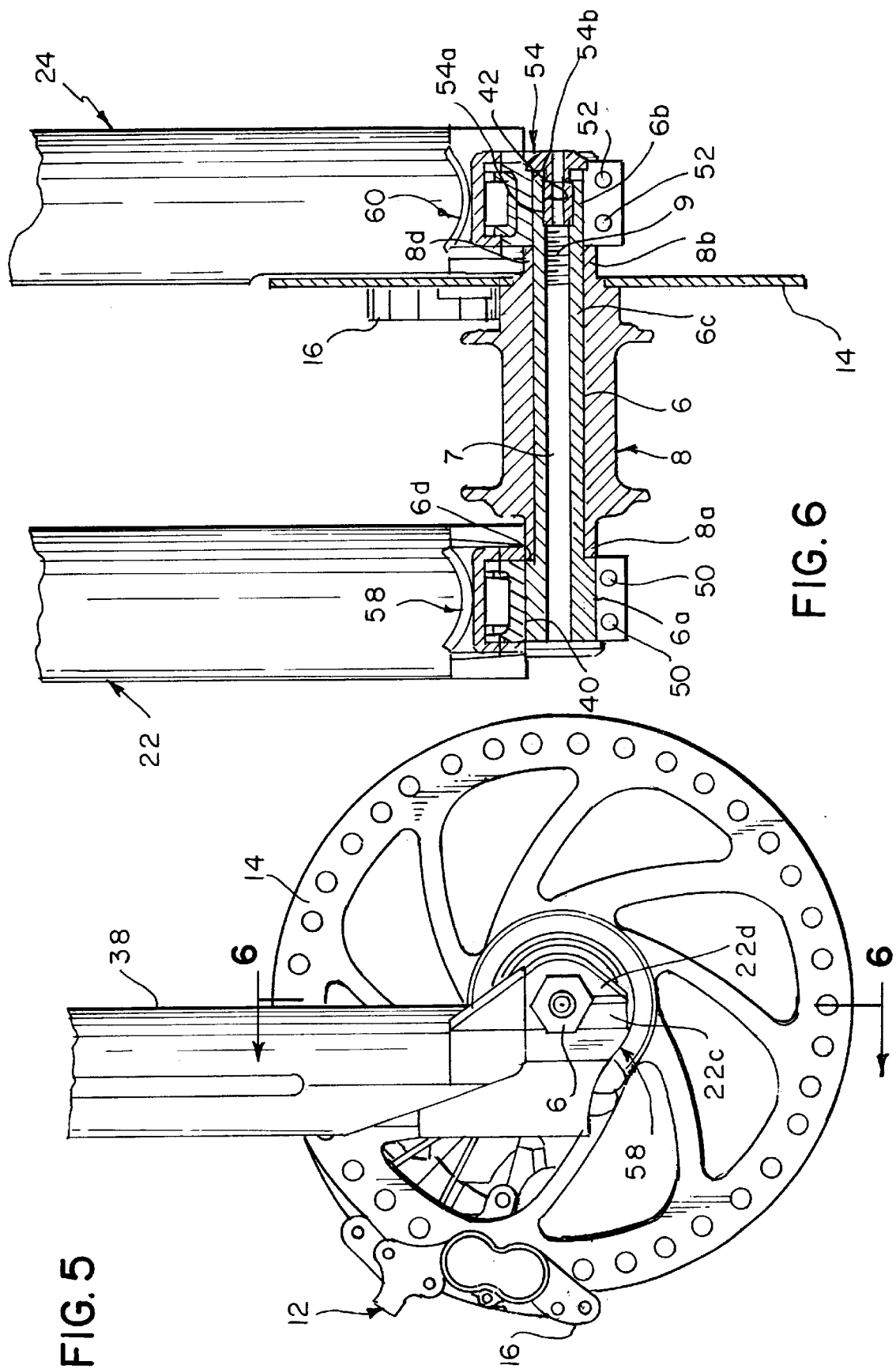

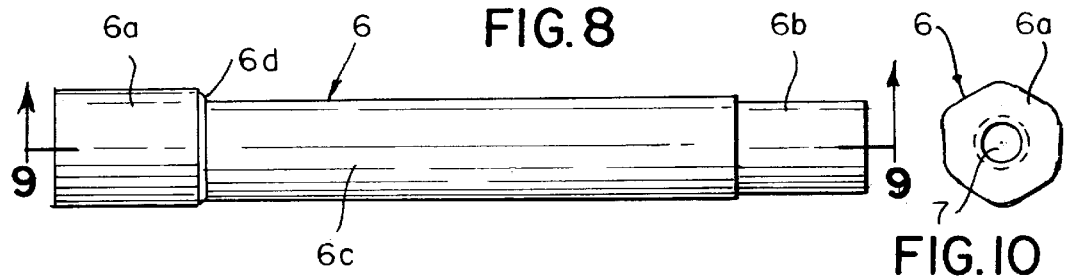
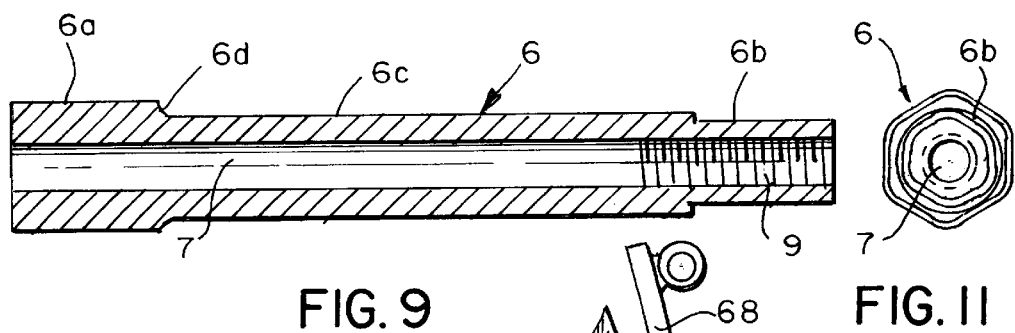
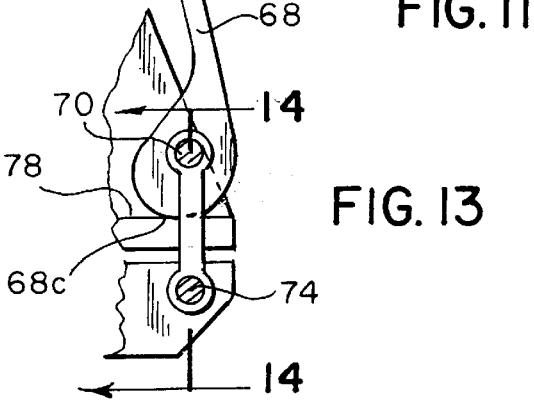
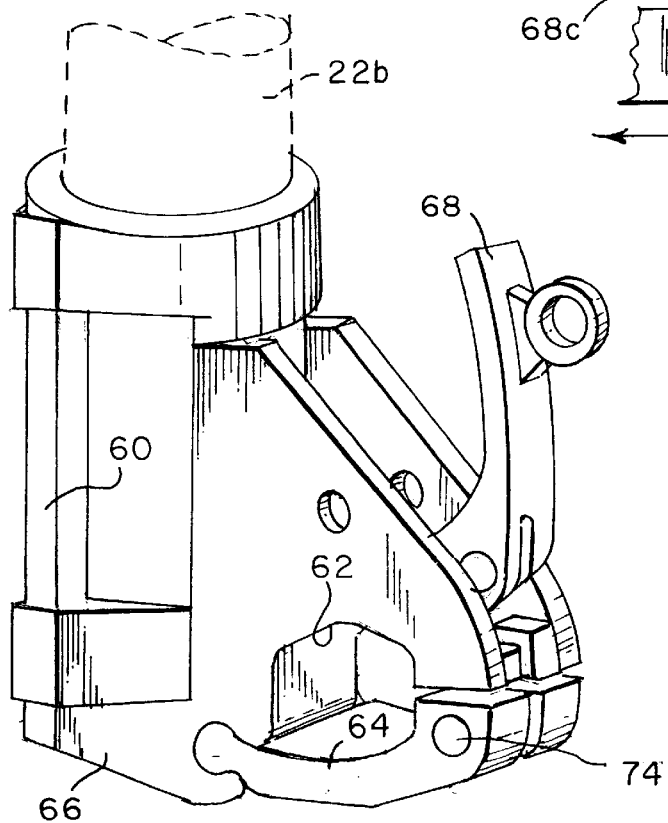
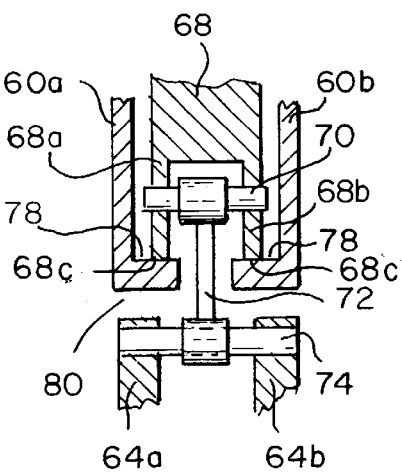

FRONT FORK FOR CYCLES

FIELD OF THE INVENTION

An inverted front fork for bicycles and motorcycles includes an axle having non-circular ends that are clamped within corresponding non-circular dropout openings contained in the lower sections of the leg portions of the fork, thereby to increase the torsional stiffness of the fork.

BACKGROUND OF THE INVENTION

Brief Description of the Prior Art

It has been proposed to provide front forks for bicycles and motorcycles that are of the so-called "inverted" or "upside down" type, wherein the outer cylindrical section of each of the telescopic legs of the fork is connected with the crown portion of the fork. As distinguished from conventional front forks as illustrated by the patents to Steward U.S. Pat. No. 5,833,259, Gonzalez U.S. Pat. No. 5,848,675 and Gonzalez, et al. U.S. Pat. No. 6,120,049, in the inverted front forks the conventional arch members connecting the upper ends of the lower telescopic sections of the leg portions of the fork are eliminated.

During the development and testing of such inverted front forks, it became apparent that the axle played a significant role in the torsional stiffness with this type of fork execution. Since the upside down design lacks the traditional brake arch or brace (which plays a critical role in the torsional performance), the upside down design requires the axle and clamping system to make up for any loss in torsional rigidity. In the prior art, various proposals have been presented for stabilizing the axle of the front fork of a cycle. In the Becker U.S. Pat. No. 5,984,423, it has been proposed to provide a wheel hub retaining device that contains a bore for receiving the skewer rod upon which the wheel is mounted, and a projecting portion shaped to fit securely within the dropout slot. Thus, the loads on the wheel are transferred to the interface between the hub and hub retainer rather than to the interface between the skewer rod and the dropout. Similarly, in the SUPERDUPERBUBBA suspension hub manufactured by Ringle Components Inc. of Trenton, N.J., it was proposed to shape the ends of the front fork axle with a D-shaped cross-sectional configuration corresponding to the dropout slot configuration, thereby to increase the stiffness of the entire fork/wheel system by turning the axle into a torsion bar. Pace Engineering of Great Britain has recently proposed an axle having non-circular end portions adapted for insertion within the dropout slots contained in the lower extremities of the legs of a front fork.

Applicant found that the traditional way of executing a thru axle design, which consist of a round axle that goes "thru" the hub and is pinched at the fork dropouts, was not adequate. It did not give the upside down design the torsional properties necessary for even acceptable performance. Prior proposals for stiffening the axle to fork connection included the use of an oversized axle dropout and hub system, which was significantly larger in diameter both through the hub and at the dropout clamping area. This was done not only to increase the strength and stiffness of the axle, but more importantly, to increase the punch area at the dropouts to create a stiffer junction. This system had many drawbacks, such as requiring a custom hub that would not accept the industry standard of 20 mm diameter axles through the hub. This would be costly due to the requirement for a custom hub or wheel configuration, make it unfriendly to consumers that already own wheels and as additional expense to the purchase of the fork. Also, for the purpose the axle serves, the 20 mm dimension is more than adequate. Furthermore, the larger hub, axle, and dropouts add unsprung weight over the 20 mm axle design, which is undesirable for the fork performance. Unsprung weight is weight that responds to the moment of the suspension action, and it is inertia that the fork has to overcome to respond to the terrain. The lighter the unsprung weight, the quicker the fork can respond to the terrain. It would potentially require a different disk brake rotor as most rotors are designed for the smaller hub flanges used in the 20 mm axle design. This would limit brake options and again add cost due to custom configurations. This oversize design would still not fully address the true problem, which is slippage/movement from the round axle at the dropout junction.

In order to avoid the above and other drawbacks of the known systems, the concept of using an axle shape that would lock the axle in the dropouts was developed, thereby eliminating the possibility of the axle having the opportunity to rotate in the dropout clamp. This would also put the axle into a true torsion spring situation, which would allow for further "tuning" of torsional stiffness by changing materials and thickness of axle. All of this while still using a 20 mm OD axle. It was decided to go with a hexagonal shape owing to advantages in manufacturability, installation, and durability. The same benefits, however, could be gained from numerous shapes, including square, oval, rectangular, etc. The results of the Hex Axle system were impressive. It reduced torsional deflection by half over the traditional 20 mm round clamping, and equaled or surpassed the oversize designs with a smaller, lighter, and more effective design. It was a major breakthrough that resulted in an upside down front fork design that surpasses the performance benchmark that was previously available.

SUMMARY OF THE INVENTION

Accordingly, a primary object of the present invention is to provide an inverted type front fork system for bicycles and motorcycles, including an axle the ends of which are non-circular and extend within corresponding non-circular dropout openings contained in the lower extremities of the leg portions of the fork.

A more specific object of the invention is to provide improved locking means for clamping the non-circular end portions of the axle within the corresponding dropout openings, respectively. In one embodiment, the locking means comprise clamping bolts that pinch together the bifurcated lower extremities of the fork legs, thereby to reduce the size of the non-circular dropout opening and to clamp the axle end to the associated leg. In a second embodiment, the non-circular axle end is locked within the associated dropout opening by quick-release means including a pivotally connected locking section that is operable by cam means to reduce the side of the dropout opening, thereby to clamp the axle end therein.

Another object of the invention is to provide an inverted fork assembly as described above including tension adjusting means for displacing the free ends of the legs together against stops carried by the axle, thereby to position the legs relative to the axle prior to clamping of the axle to the legs, whereby accurate positioning of the legs relative to the axle promotes an increase in the torsional stiffness of the inverted fork. This feature is particularly important when the fork assembly includes disk brake means having a brake disk on the wheel hub that cooperates with brake pads mounted on the adjacent fork leg.

A further object of the invention is to provide an axle having a first end that is enlarged and non-circular in cross section, an intermediate portion that has a uniform-cylindrical outer circumference upon which the wheel hub is rotationally mounted, and a second non-circular end portion of smaller cross-sectional area than the cylindrical intermediate portion. In this manner, during assembly, the axle smaller end may be introduced, in succession, through a first dropout opening, the bore of the wheel hub, and finally into the second dropout opening, whereupon the dimensions of the dropout openings are reduced to clamp the fork leg portions to the non-circular axle ends, respectively.

BRIEF DESCRIPTION OF THE DRAWINGS

Other objects and advantages of the invention will become apparent from a study of the following specification when viewed in the light of the accompanying drawings, in which:

FIG. 3 is a sectional view of the fork assembly taken along line 3—3 of FIG. 2;

FIGS. 4 and 5 are detailed front and side elevational views of the axle, hub, and fork assembly, and FIG. 6 is a sectional view taken along line 6—6 of FIG. 5;

FIG. 7 is a detailed end view of a non-circular axle end clamped by a first locking embodiment within the dropout opening;

FIG. 8 is a side elevational view of the axle, and

FIG. 9 is a sectional view taken along line 9—9 of FIG. 8;

FIGS. 10 and 11 are left and right hand end views, respectively, of the axle of FIG. 8;

FIG. 12 is a perspective view of a quick-release second embodiment of the axle locking means;

FIG. 13 is a detailed view of the cam operating means of FIG. 12; and

FIG. 14 is a sectional view taken along line 14—14 of FIG. 13.

DETAILED DESCRIPTION

Figure 1:
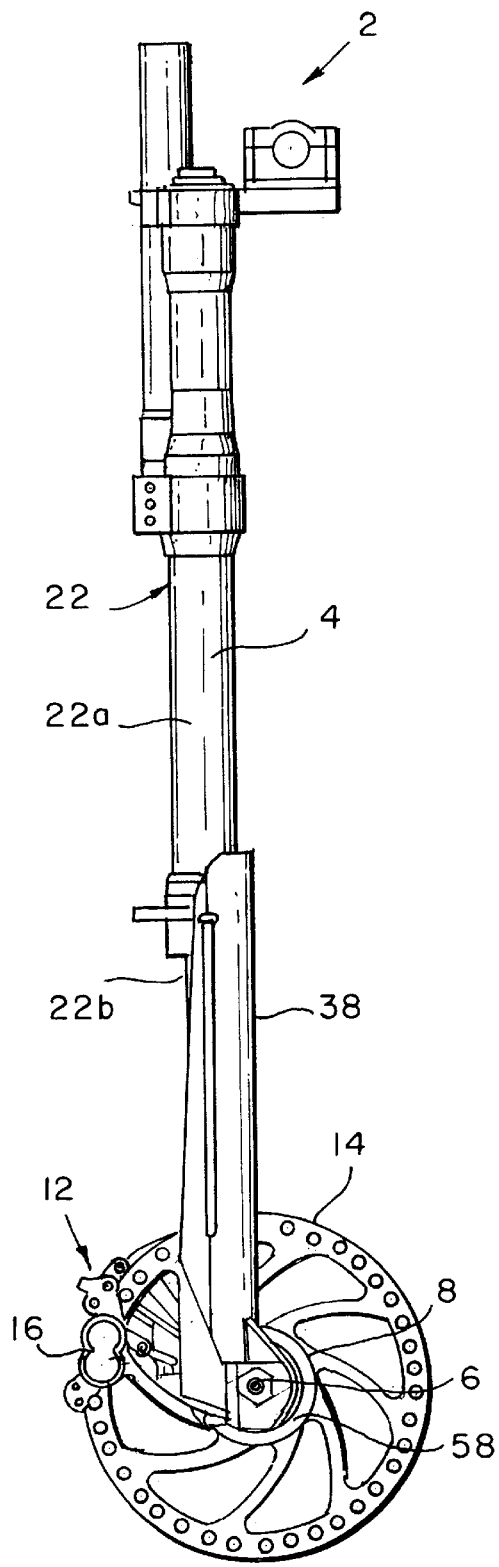
FIGS. 1 and 2 are side elevation and partially sectioned front views, respectively, of the inverted front fork. axle and hub assembly of the present invention.
Figure 2:
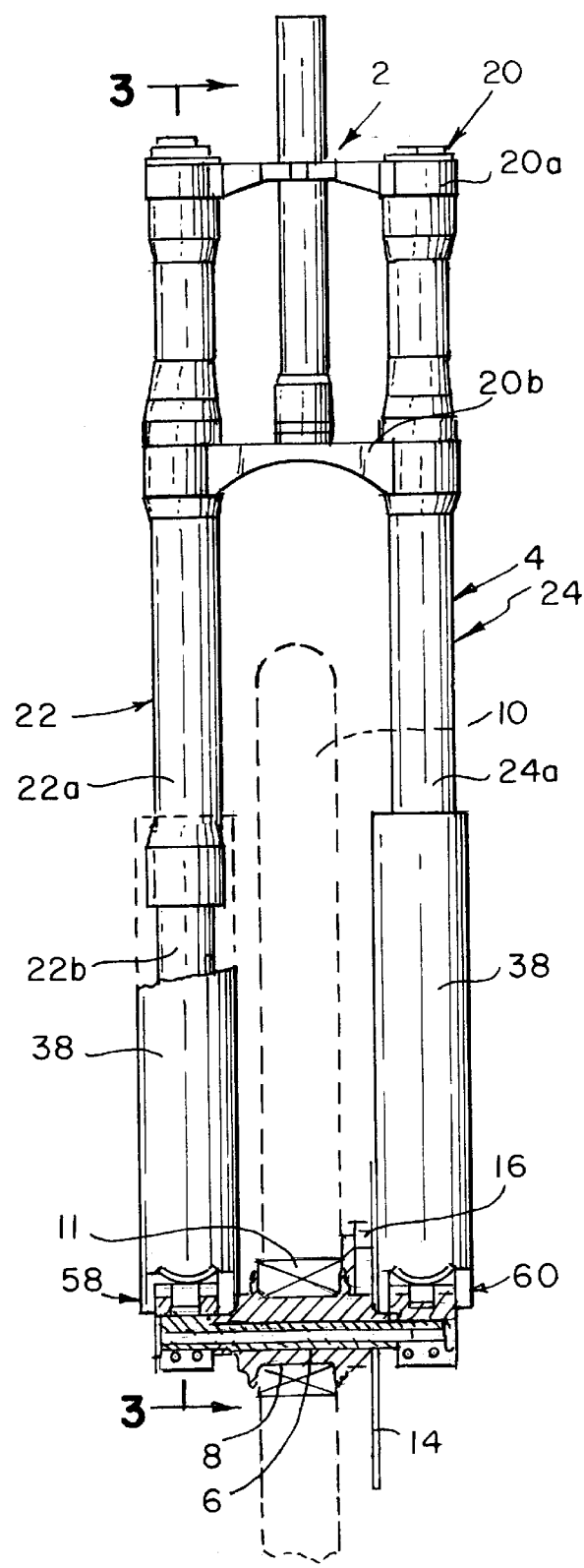

Referring first more particularly to FIGS. 1 and 2, the front fork, axle, and wheel hub assembly 2 includes a front fork 4 of the "inverted" or "upside-down" type, an axle 6, and a wheel hub 8 that supports a conventional cycle wheel 10 for rotation about bearing means 11. Conventional disk brake means 12 are provided including a brake disk 14 mounted on the wheel hub 8, and brake pad means 16 mounted on the associated leg of the front fork 4.

The front fork 4 is of the inverted type including a horizontal double crown portion 20 including a pair of spaced horizontal crowns 20a, 20b, and a pair of downwardly extending leg portions 22 and 24. Each of these leg portions includes a pair of telescopically arranged sections 22a, 22b and 24a, 24b, the outer sections 22a and 24a being the upper sections, as is common in the inverted type of fork. As shown in FIGS. 3 and 4, conventional shock absorbing pistons 26 and 28 are provided in one of the legs, adjustment means 30 and 32 being provided at the upper and lower ends of the leg for adjusting the dampening characteristics of the shock absorber. A convention compression spring 34 is mounted in the other leg 24, as shown in FIG. 4.

Referring now to FIGS. 8 and 9, the axle 6 concludes a pair of first and second end portions 6a and 6b, and an intermediate portion 6c. The first end portion 6a has a larger cross sectional area than that of the intermediate portion 6c, and the second end portion 6b has a cross sectional area that is smaller than that of the intermediate portion 6c. In accordance with the present invention, each of the end sections 6a and 6b has a non-circular cross-sectional configuration. In the illustrated embodiment, the end portions have a hexagonal cross-sectional configuration, although other non-circular configurations are equally suitable; for example, square or rectangular configuration, semi-circular configuration, oval configuration, or the like. The intermediate axle portion 6c has a uniform cylindrical outer circumferential surface upon which the wheel hub 8 is concentrically mounted. In order to reduce weight, the axle is tubular and contains a throughbore 7 that is internally threaded at one end by the screwthreads 9.

Referring now more particularly to FIGS. 4–7, according to a first embodiment of the invention, the non-circular end portions of the axle are rigidly clamped within dropout openings 40 and 42 having a non-circular cross-sectional configurations corresponding with that of the associated axle ends, respectively. The dropout openings are contained in locking means 58 and 60 arranged at the lower ends of the fork legs 22 and 24.

Referring to FIG. 6, in order to assemble the axle and wheel hub to the fork legs 22 and 24, the smaller end of the axle 6b is inserted successively through the first dropout opening 40, through the longitudinal bore contained within the wheel hub 8, and into the dropout opening 42 contained in the leg portion 24. The wheel hub 8 is provided at each end with axially-extending sleeve portions 8a and 8b, respectively. Thus, when the hub sleeve extension 8a abuts the stop surface 6d defined at the end of the large portion 6a, further displacement of the axle to the right relative to the wheel hub 8 is prevented. The enlarged end 6a of the axle is clamped within the opening 40 by the first locking means 58 as best illustrated in FIG. 7. More particularly, the lower extremity of the leg 2a is bifurcated to define a slot 48 that extends upwardly in communication with the dropout opening 40. Transverse clamping bolts 50 are tightened to bring the bifurcated portions 22c and 22d toward each other, thereby to clamp the enlarged end 6a within the dropout opening 40. At the right hand end, a tension bolt 54 having a threaded shank portion 54a and an enlarged head portion 54b is threadably connected within the internal threaded portion 9 on the interior of the bore of the axle 6. The enlarged head portion 54b extends within a corresponding counterbore contained in the second locking means 60 at the lower end of the leg portion 24. Thus, upon rotation of the tension bolt 54, the enlarged head portion 54b displaces the locking means 60 to the left relative to the axle end portion 6b, whereupon the locking means 60 engages the stop or abutment surface 8d defined at the right-hand end of the wheel hub 8. When this occurs, the clamping bolts 52 are tightened to displace the bifurcated portions of the leg 24 together to reduce the size of the dropout opening 42, thereby to clamp the smaller non-circular end portion 6b within the corresponding dropout opening 42. As a consequence of the tensioning adjustment and the final clamping of the axle ends to the leg portions, respectively, the torsional stiffness of the inverted front fork 4 is significantly increased, thereby importing the desired rigidity to the front fork.

Referring now to FIGS. 12–14, and alternative quick-release embodiment is disclosed for clamping the non-circular axle ends within the corresponding non-circular dropout openings. More particularly, the quick-release means includes a housing 60 containing a vertical bore for receiving by a force fit the corresponding lower end of the lower leg section 22*b*. The hexagonal shaped dropout opening 62 is partially defined by a housing jaw section 64 that is pivotally connected to the main body section 60 by pivot connection 66. A quick release lever 68 is pivotally mounted on a transverse pivot shaft 70 that extends between the bifurcated leg portions 68*a* and 68*b* of the lever 68, as best shown in FIG. 14. Pivotally mounted on the transverse shaft 70 is a connecting link 72 the lower end of which is pivotally connected with a transverse shaft 74 that extends between the bifurcated portions 64*a* and 64*b* of the housing pivot section 64. The lower end of the quick-release lever 68 is provided with cam surfaces 68*c* that engage the flat horizontal surfaces 78 on the bifurcated portions 60*a* and 60*b* of the housing 60. Thus, when the quick-release lever 68 is pivoted in the counter-clockwise direction about its pivot shaft 70, the cam surfaces 68*c* react with the horizontal surface 78 to displace the connecting link 72

What is claimed is:

1. A front fork and wheel assembly for cycles, comprising:
   (a) a bifurcated front fork including at least one horizontal crown portion, and a pair of parallel spaced vertical leg portions extending downwardly from said crown portion, said leg portions having lower ends containing axle dropout openings, respectively, at least a first one of said dropout openings having a non-circular cross-sectional configuration, each of said fork leg portions including upper and lower tubular telescopically-arranged sections;
   (b) compression spring means arranged within at least one of said leg portions for biasing vertically apart the sections of said one leg portion;
   (c) shock absorber means for dampening the vertical displacement of the sections of said one leg portion;
   (d) wheel means including a tubular hub;
   (e) a tubular axle extending through said hub, said axle having first and second end portions that extend within said leg portion dropout openings, respectively, at least said axle second end portion being internally threaded and having a non-circular cross-sectional configuration corresponding with the non-circular cross-section of said first dropout opening;
   (f) tensioning means for displacing together the end extremities of said leg portions prior to the locking thereof to said axle, said tensioning means including a tensioning bolt having a shank portion threadably connected with said axle second end portion, said tensioning bolt having an enlarged head portion operable to cooperate with the outer surface of the associated leg portion that is remote from the other leg portion; and
   (g) locking means for locking said axle end portions within said dropout openings, respectively, thereby to increase the torsional stiffness of said front fork.

2. A front fork and wheel assembly as defined in claim 1, and further including stop means limiting the extent of displacement of said leg portions toward each other.

3. A front fork and wheel assembly as defined in claim 2, wherein each of said axle first and second end portions has a non-circular cross-sectional configuration, and an intermediate portion extending between said first and second end portions, said intermediate portion having a uniform cylinder circumferential surface upon which said hub is rotationally mounted, said first end portion being enlarged and having a greater cross-sectional area than said intermediate axle portion, said stop means including a first stop defined by said enlarged end portion against which a first end of said hub abuts.

4. A front fork and wheel assembly as defined in claim 3, wherein said stop means includes a second stop carried by the leg adjacent the smaller end of said axle for abutting engagement with a second end of said wheel hub.

5. A front fork and wheel assembly as defined in claim 4, wherein said wheel hub includes at opposite ends axially extending sleeve portions arranged for abutment with said first and second stops, respectively.

6. A front fork and wheel assembly for cycles, comprising:
   (a) a bifurcated front fork including at least one horizontal crown portion, and a pair of parallel spaced vertical leg portions extending downwardly from said crown portion, said leg portions having lower ends containing axle dropout openings, respectively, each of said dropout openings having a non-circular cross-sectional configuration, each of said fork leg portions including upper and lower tubular telescopically-arranged sections;
   (b) compression spring means arranged within at least one of said leg portions for biasing vertically apart the sections of said one leg portion;
   (c) shock absorber means for dampening the vertical displacement of the sections of said one leg portion;
   (d) wheel means including a tubular hub;
   (e) a tubular axle (6) extending through said hub, said axle having spaced first (6*a*) and second (6*b*) end portions that extend within said leg portion dropout openings, respectively, and a cylindrical intermediate portion (6*c*) arranged between said first and second end portions, said intermediate portion having a uniform cylindrical outer surface about which said wheel hub is concentrically mounted, each of said first and second axle end portions having a non-circular cross-sectional configuration corresponding with the non-circular cross-section of the associated dropout opening, respectively, said axle being longitudinally stepped with said first and second end portions having cross-sectional areas that are greater and smaller, respectively, than the cross-sectional area of said axle intermediate portion, said first axle end portion having an end surface defining an annular stop surface (6*d*) adjacent said axle intermediate portion, said second axle end being axially insertable successively through one of said dropout openings, through said hub, and through the other of said lockout openings;
   (f) first locking means (58) for locking said first axle end portion within the corresponding dropout opening;
   (g) tensioning means (54) for axially displacing said wheel hub toward abutting engagement with said stop surface (6*d*); and
   (h) second locking means (60) for locking said second axle end portion within the corresponding dropout opening, thereby to increase the torsional stiffness of the front fork.

7. A front fork and wheel assembly as defined in claim 6, and further including:
   (i) disk brake means for braking the rotation of said wheel hub, comprising:
      (1) a brake disk arranged concentrically at one end of said wheel hub; and (2) brake pad means mounted on one of said fork leg portions for cooperation with said brake disk.

8. A front fork and wheel assembly as defined in claim 6, wherein the lower extremities of said leg portions are bifurcated to define vertical slots communicating with the associated dropout openings, respectively;

and further wherein said locking means comprise clamping bolts for displacing together the bifurcated lower extremities of said leg portions on opposite side of said slots, respectively, thereby to reduce the dimensions of said dropout openings to clamp the end portions of said axle to said fork leg portions, respectively.

9. A front fork and wheel assembly as defined in claim 6, wherein at least one of said first and second locking means include quick-release means.

10. A front fork and wheel assembly as defined in claim 9, wherein the lower extremity of each of said leg portions is connected with a sectional housing containing a first portion of the dropout opening, and a pivotally connected second section that carries a second portion of the associated dropout opening, and lever-operated cam means for pivoting said second section to reduce the size of said dropout opening, thereby to clamp the corresponding axle end portion within said dropout opening.

11. A front fork and wheel axle assembly as defined in claim 6, wherein both end portions of said axle and the associated dropout openings have hexagonal cross-sectional configurations.

\* \* \* \* \*